United States Patent
Rostron et al.

(10) Patent No.: US 7,460,551 B2
(45) Date of Patent: Dec. 2, 2008

(54) DATA-DRIVEN INTERFACE CONTROL CIRCUIT

(75) Inventors: Andy E. Rostron, Everett, WA (US); Mitel Kuliner, Bellingham, WA (US)

(73) Assignee: Harris Corporation, Melbourne, FL (US)

( * ) Notice: Subject to any disclaimer, the term of this patent is extended or adjusted under 35 U.S.C. 154(b) by 927 days.

(21) Appl. No.: 10/183,492

(22) Filed: Jun. 28, 2002

(65) Prior Publication Data
US 2004/0001504 A1 Jan. 1, 2004

(51) Int. Cl.
*H04L 12/56* (2006.01)

(52) U.S. Cl. .......... 370/419; 370/442; 710/10

(58) Field of Classification Search ......... 370/294, 370/337, 347, 442, 419, 463, 252, 254, 386, 370/320, 321, 336; 709/231, 318, 321, 250, 709/223, 220–222; 719/326; 710/1, 8, 10; 707/227, 1
See application file for complete search history.

(56) References Cited

U.S. PATENT DOCUMENTS

| | | | |
|---|---|---|---|
| 5,265,252 A * | 11/1993 | Rawson et al. ......... 719/326 |
| 5,513,343 A | 4/1996 | Sakano et al. ......... 714/26 |
| 5,729,472 A | 3/1998 | Seiffert et al. ......... 702/188 |
| 5,787,409 A | 7/1998 | Seiffert et al. ......... 706/45 |
| 6,012,152 A | 1/2000 | Douik et al. ......... 714/26 |
| 6,108,616 A | 8/2000 | Borchers et al. ......... 702/163 |
| 2002/0065950 A1 * | 5/2002 | Katz et al. ......... 709/318 |
| 2003/0088711 A1 * | 5/2003 | Tabares et al. ......... 709/321 |
| 2003/0101158 A1 * | 5/2003 | Pinto et al. ......... 707/1 |
| 2005/0080936 A1 * | 4/2005 | Ray et al. ......... 710/1 |

* cited by examiner

Primary Examiner—John Pezzlo
(74) Attorney, Agent, or Firm—Duane Morris LLP

(57) ABSTRACT

A method and apparatus for an improvement of a computer network by bringing commonality down to the device driver level. The computer network having at least one processor node having a circuit control module and a plurality of dedicated combinations of device driver and device object. Each of the dedicated combinations is capable of exchanging data between a circuit control module and one device type of a plurality of device types. The dedicated combinations of the device driver and the device object are replaced by a generic device driver and generic device agent capable of exchanging data between the circuit control module and any one of the plurality of device types.

35 Claims, 4 Drawing Sheets

DATA-DRIVEN INTERFACE CONTROL CIRCUIT

CROSS REFERENCE TO RELATED APPLICATIONS

The present application is related to co-pending and commonly assigned PCT International Application No. PCT/US02/03323 entitled "Dynamic Bandwidth Allocation", PCT/US02/03322 entitled "Demodulator Bursty Controller Profile", PCT/US02/03193 entitled "Demodulator State Controller", PCT/US02/03189 entitled "Frame to Frame Timing Synchronization", the disclosures of which are hereby incorporated herein by reference. The aforementioned applications are related to commonly assigned U.S. Pat. No. 6,016,313 entitled "System and Method for Broadband Millimeter Wave Data Communication" issued Jan. 18, 2000 and currently undergoing two re-examinations under application Ser. No. 90/005,726 and application Ser. No. 90/005,974, U.S. Pat. No. 6,404,755 entitled "Multi-Level Information Mapping System and Method" issued Jun. 11, 2002, U.S. patent application Ser. No. 09/604,437, entitled "Maximizing Efficiency in a Multi-Carrier Time Division Duplex System Employing Dynamic Asymmetry", which are a continuation-in-part of the U.S. Pat. No. 6,016,313 which are hereby incorporated herein by reference.

The present application is related to and is being concurrently filed with commonly assigned U.S. patent application Ser. No. 10/183,383, entitled "Look-Up Table for QRT", U.S. patent application Ser. No. 10/183,488, entitled "Hybrid Agent-Oriented Object Model to Provide Software Fault Tolerance Between Distributed Processor Nodes, U.S. patent application Ser. No. 10/183,486, entitled "Airlink TDD Frame Format", U.S. patent application Ser. No. 10/183,492, entitled "Data-Driven Interface Control Circuit and Network Performance Monitoring System and Method", U.S. patent application Ser. No. 10/183,490, entitled "Virtual Sector Provisioning and Network Configuration System and Method", U.S. patent application Ser. No. 10/183,489, entitled "System and Method for Supporting Automatic Protection Switching Between Multiple Node Pairs Using Common Agent Architecture", U.S. patent application Ser. No. 10/183,384, entitled "System and Method for Transmitting Highly Correlated Preambles in QAM Constellations", the disclosures of which is hereby incorporated herein by reference.

BACKGROUND OF THE INVENTION

FIG. 1 illustrates a prior art processor node 100 of a computer network. The processor node includes a circuit control module 111 and a plurality of dedicated combinations 120, 130, 140 of device drivers 121, 131 and 141 and device objects 122, 132 and 142 respectvely. The dedicated combinations 120, 130 and 140 enable data exchange between the circuit control module 111 and each of the devices 171, 172 and 173 respectively.

The elements of the dedicated combinations are interface unit specific, that is the device objects (interface objects) are specifically dedicated (e.g. preprogrammed, hard-wired) to interface with a certain type of device drivers and ultimately certain type of devices. The output and the input data of the device object with respect to the circuit control module 111 are however in generic form. The output and input data of the devise object with respect to the device driver is not generic and is device specific. In FIG. 1, the devices for illustration purposes are fiber optic line 170, modem 171, and T1 172 connections. The device driver 121 and the device object 122 used to drive the fiber optic device 170, is not capable of driving the modem device 171. Since each device and device driver of the prior art processor is type specific, the interface object or device object is specifically tailored to translate information from the particular disparate source (i.e. the device driver) into generic information that is usable in the circuit control module 111.

Similarly in FIG. 2, a prior art processor node 200 of a computer network includes a circuit control module 211 and a plurality of dedicated combinations 220, 230, 240 of device drivers 221, 231 and 241 and device objects 222, 232 and 242 respectively. In addition the device objects 222, 232 and 242 are operable connected to data tables 223, 233 and 243 respectively. The data tables are relational databases enabling information exchange. The dedicated combinations 220, 230 and 240 enable data exchange between the circuit control module 111 and each of the devices 271, 272 and 273 respectively. Similarly the elements of the dedicated combinations are interface unit specific, that is the device objects 222, 232 and 242 (interface objects) are specifically dedicated (e.g. preprogrammed, pre-wired) to interface with a certain type of device drivers and ultimately certain type of devices.

Likewise performance monitoring of the devices 170, 171, and 172 is necessarily device specific and not conducive to distributed monitoring functions. In the prior art processor node 100, the circuit control module 111 is a circuit state machine with data driven performance monitoring and archive. The storage capacity of the archive as it is contained within the node 100 is limited and thus its memory is constantly reused. The processor node in FIG. 2 may also include a supplemental archive 250, however this memory is equally limited due to space and configuration factors. The data in the archive 250 is also limited to used in the single processor node 200. Monitoring statistics such a report period, functions and alarms all must be incorporated into the circuit control module 111. Substitution of device 170 requires a new dedicated combination 120 of device driver 121 and device object 122. Initialization, monitoring, reporting and detecting functions are required for network performance monitoring. These functions are unfortunately done differently based on the type of device the device driver connects to. Therefore, depending on the characteristics of the device, the circuit control module 111 may need to be re-coded or changed which is labor intensive.

The prior art processors do not allow dynamic performance monitoring scheduling, or allow for persistent storage of performance data, and a single processor only supports the monitoring. For these and other reasons, there is a need for reducing commonality down to the device driver level, allowing for distributed gathering of performance monitoring records, generic performance monitoring records, distributed scheduling, performance monitoring across redundant processor nodes and incorporating device programming and control into same agent.

SUMMARY OF THE INVENTION

It is an object of the present invention is method and apparatus for an improvement of a computer system. The computer system having at least one processor node having a circuit control module and a plurality of dedicated combinations of device driver and device object. Each of the dedicated combinations is capable of exchanging data between said circuit control module and one device type of a plurality of device types. The improvement, for at least one of the dedicated combinations, the device driver and the device object are replaced by a generic device driver and generic device agent capable of exchanging data between the circuit control module and any one of the plurality of device types.

Another object of the present invention is a method and apparatus for improvement of a computer system. The computer system having a plurality of processor nodes, with each having a circuit control module and a plurality of dedicated combinations of device driver and device object. Each of the dedicated combinations is capable of exchanging data between the circuit control module and one device type of a plurality of device types. The improvement wherein the circuit control module of each of the plural processor nodes is replaced by a control agent operationally connected to each of the plural processor nodes, and for at least one of the dedicated combinations, the device driver and the device object are replaced by a generic device driver and a generic device agent capable of exchanging data between the control agent and any one of the plurality of device types.

These and many other objects and advantages of the present invention will be readily apparent to one skilled in the art to which the invention pertains from a perusal of the claims, the appended drawings, and the following detailed description.

BRIEF DESCIPTION OF THE DRAWINGS

DETAILED DESCRIPTION

The present invention utilizes a plurality of processor nodes for data driven network interface management for a computer network. The interface management initializes the hardware circuitry, monitors interfaces, reports the status, performance monitoring statistics and alarms and is preferable intended for use with memory mapped hardware design.

The implementation of interface management through the processor nodes allows for distributed gathering of performance monitoring records, distributed scheduling of performance monitoring, persistent storage of performance monitoring records.

Figure 2:
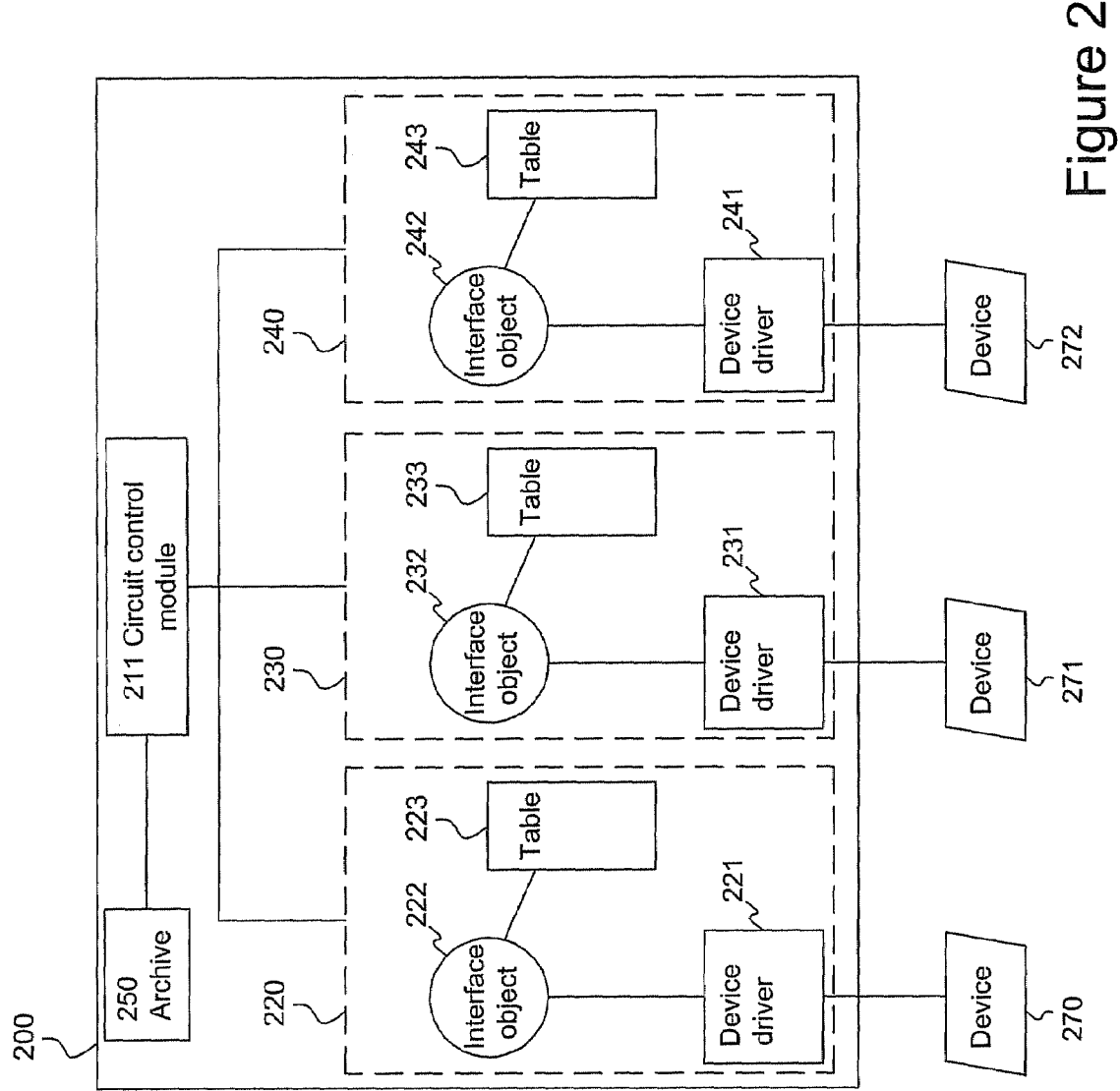
FIG. 2 illustrates a prior art processor node with driver tables.
Figure 3:
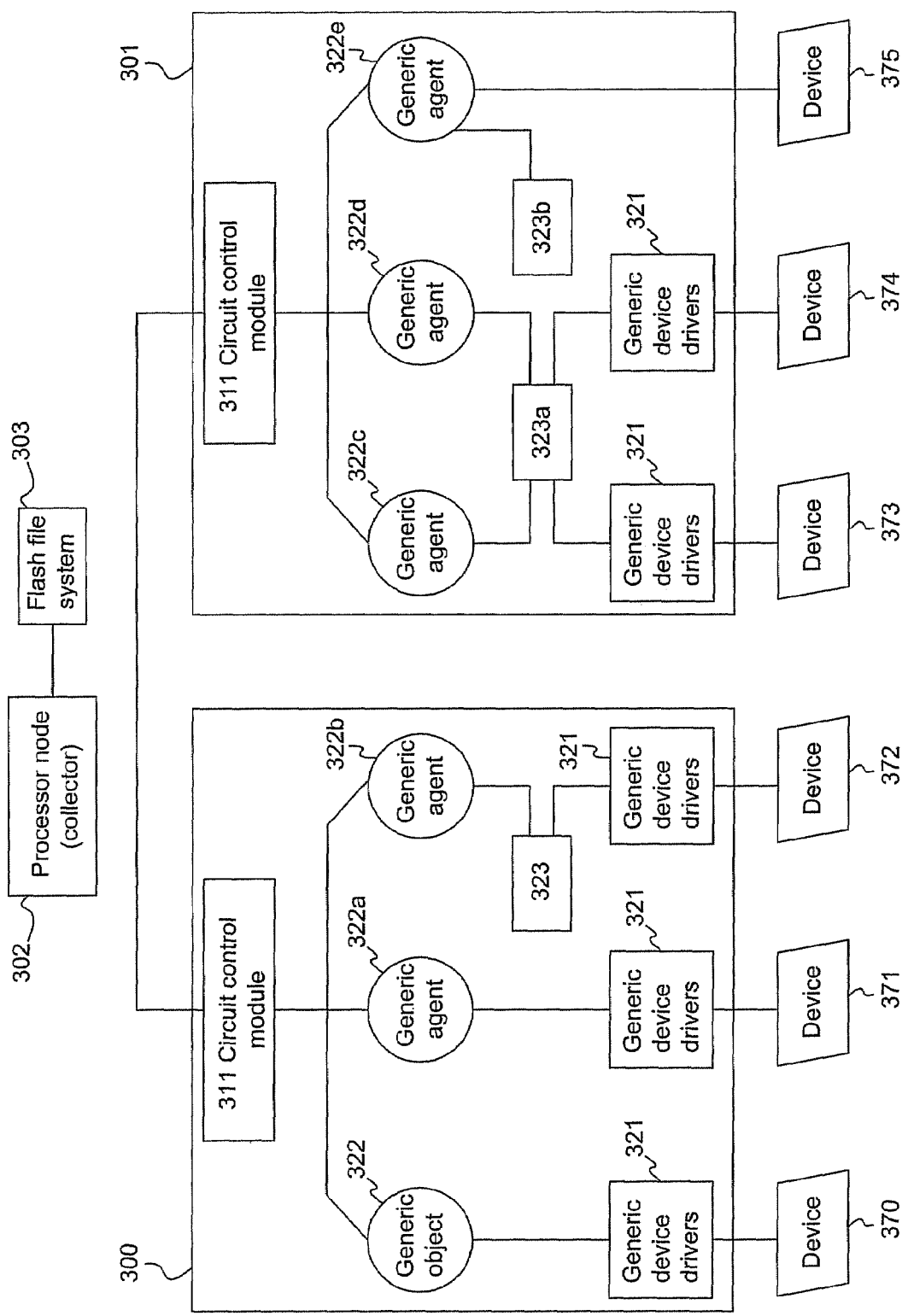
FIG. 3 illustrates an embodiment of processor nodes according to the present invention.

FIG. 3 illustrates processor nodes 300 and 301 in a computer network for an embodiment of the present invention. The processor nodes include a circuit control module 311 and may include a plurality of dedicated combinations similar to 120, of device drivers 121, and device object 122. The dedicated combinations (shown in FIGS. 1 and 2) enable data exchange between the circuit control module 311 and each of the devices. The circuit control module 311 can be implemented as a hardware device or as a software object operating within the node.

Figure 1:
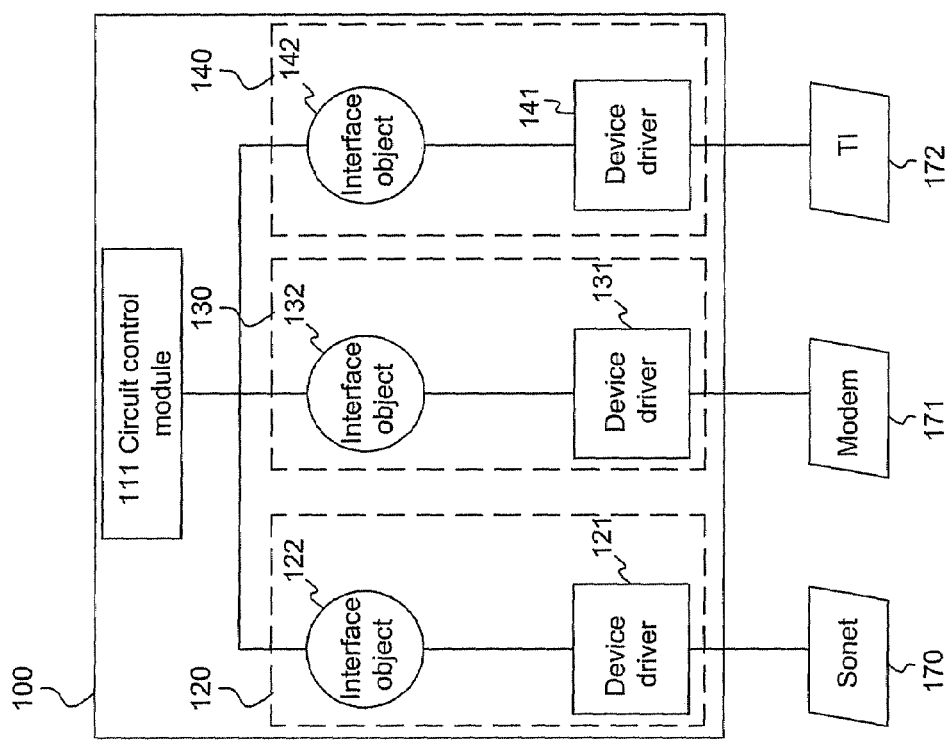
FIG. 1 illustrates a prior art processor node.

The dedicated combinations of the prior art in FIGS. 1 and 2 are replaced with generic combinations composed of generic device drivers 322 and generic device object (agent, agent object, device agent, interface agent, generic agent). The generic device drivers 321 and generic device agents 322 take the place of the dedicated combinations of the prior art processors. The generic device drivers 321 and generic device agents 322 bring the commonality down to the device driver level. The generic device drivers and generic device agents enable data exchange between the circuit control module 311 and their associated device. The generic device drivers and generic device agents much like the dedicated combinations also initialize the devices. (i.e. populates the registers to turn on the devices) However the generic device driver and generic device agent are capable of exchanging data between any of the devices and circuit control module. That is the generic combinations can replace any of the dedicated combinations without changing the generic device driver or generic device agent. Furthermore each generic combination can be freely substituted for other generic combinations. The data exchanged between the circuit control module 311 and the plurality of devices preferably includes performance monitoring data, fault detection data and operational reporting data.

In FIG. 3, the devices for illustration purposes are a fiber optic device 370, modem 371, and T1 373 and ATM 375 types. However any kind of device where statistics or performance monitoring can be offered or desired from the device driver can be used. The output and the input data of the generic device object is generic with respect to both the circuit control module 311 and the generic device driver. Therefore the generic combination, of generic device agent 322 and generic device driver 321, driving device 370 can easily be substituted to drive device 371.

The generic object 322b is further connected to a relational database table 323 that facilitate data exchange. The generic agent 322c and 322d in processor node 301 are operationally connected to a shared a relational database 323a. The generic agent 322e uses relational database table 323b and drive the device 375 directly without the need of a distinct device driver since most of the device driver functions are incorporated into the generic agent. The generic agent is preferably a common agent with access to a common agent facility with attachment lists and signal maps. Common agents reside on or incorporate some the circuit state machine functions of the device objects and device drivers. The use of common agents makes maintenance or diagnostics much easier since the user only has to access generic tables rather than each individual device driver and interface object.

Processor node 302 serves as a collector to collect and schedule performance-monitoring information. Data exchange between the processor nodes 300, 301 and the collector processor node 302 is in the form of generic messaging and generic record passing. The collection and scheduling is preferable enabled by an collection and scheduling agent which is can be an instance of C++ programming residing on the processor node. The collector processing node 302 stores the performance monitoring records in a persistent storage device 303. The storage device 303 is not restricted by space and structure constraints since it is centralized and may serve many processor nodes. In the preferred embodiment the persistent storage device 303 is a flash file system. The persistent storage device 303 is operationally connected to the network to allow for distributed processing of the data.

Since the generic agents and generic device driver can be substituted for any device. Redundant processor nodes containing the generic combinations can serve as back up nodes for the active processor nodes. The use of a common agent allows the redundant or backup processor nodes to replace the active node without re-coding.

Figure 4:
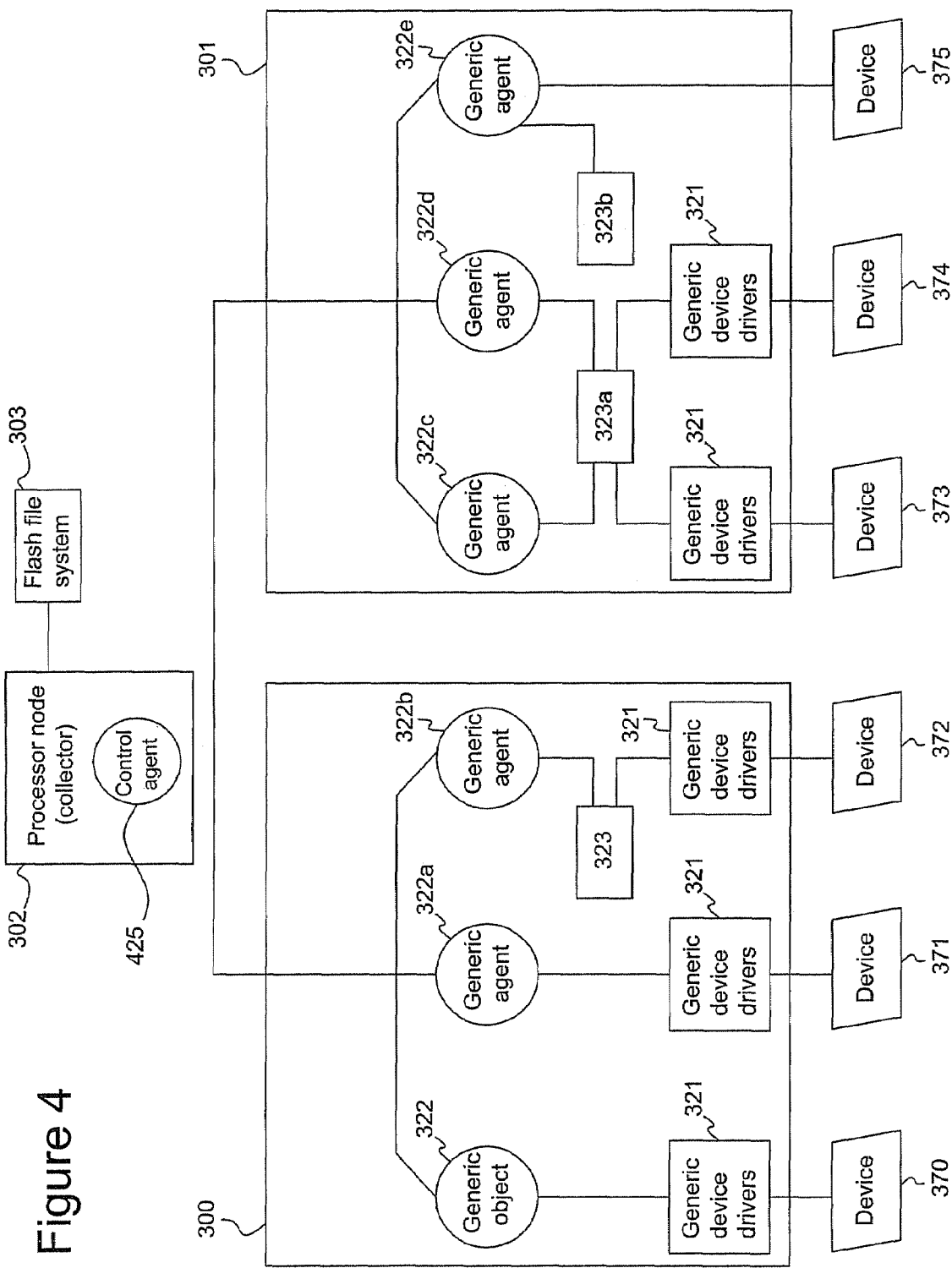
FIG. 4 illustrates an embodiment of processor nodes with a control agent according to the present invention.

A control agent 425 as shown in FIG. 4 can advantageously replace the circuit control module 311, of each of some of the processor nodes. The control agent can reside on a separate processor node, such as on the collector node 302. The control agent is operationally connected to each of the processor nodes. The control agent 425 incorporates the generic tasks and functions of the circuit control module for all the associated processor nodes. This substitution is possible because of the reduction of type specific and node specific functions as well as the implementation of the generic combinations. The control agent is preferably a common Agent with access the common agent facility with common attachment lists. In the embodiment shown in FIG. 4, the generic combinations of generic agents 322 and generic device drivers 321 enable data exchange between the associated device and the control agent 425.

The processors and agent architecture described herein is particularly suited for use in a point-to-multi-point wireless communication system used to communicate from a central location to each of a plurality of remotes sites where reliable connections are required. Such a system that provides high speed bridging of a physical gap between a plurality of processor based systems, is advantageously effected by increases in the commonality of its components and processes.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. The present invention is not intended to be limited to the embodiments shown herein but is to be accorded the widest scope consistent with the principles and novel features disclosed herein.

We claim:

1. A computer system comprising:
   at least one processor node having a circuit control module;
   a generic device driver;
   a generic device agent; and
   at least one device type among a plurality of different device types, wherein said generic device driver and said generic device agent are configured such that if data is available then data is exchanged between said circuit control module and any of said plurality of device types;
   wherein said generic device agent is operationally connected to a shared relational database.

2. The computer system of claim 1, wherein said computer system comprises a communication system.

3. The computer system of claim 1, wherein said generic device agent is a common agent.

4. The computer system of claim 2, wherein said plurality of device types comprises SONET, T1, E1, ATM, modem.

5. The computer system of claim 2, wherein said data comprises one or more of performance monitoring data, initialization data, fault detection data, and operational reporting data.

6. The computer system of claim 1, comprising plural generic device agents; wherein ones of said generic device agents are operationally connected to one of a plurality of relational databases.

7. The computer system of claim 1, wherein said generic device agent is configured such that if data is available the data is exchanged between said circuit control module and any one of said plurality of device types.

8. The computer system of claim 2, wherein said communications system is a point-to-multipoint communication system.

9. The computer system of claim 8, wherein said communications system operates in the millimeter wave frequency spectrum.

10. The computer system of claim 9, wherein said communications system is a time division multiple access system.

11. A computer system comprising:
    at least one processor node having a circuit control module;
    a generic device driver;
    a generic device agent; and
    at least one device type among a plurality of different device types, wherein said generic device driver and said generic device agent are configured such that if data is available then data is exchanged between said circuit control module and any of said plurality of device types;
    wherein said computer system comprises a point-to-multipoint communication system;
    wherein said communications system operates in the millimeter wave frequency spectrum;
    wherein said communications system is a time division multiple access system; and,
    wherein the data density within each frame is dynamically variable.

12. The computer system of claim 10, wherein said communications system is a time-division duplex system.

13. The computer system of claim 12, wherein said communications system is an adaptive time division duplex system.

14. A computer system comprising:
    at least one processor node having a circuit control module;
    a generic device driver;
    a generic device agent; and
    at least one device type among a plurality of different device types, wherein said generic device driver and said generic device agent are configured such that if data is avaliable then data is exchanged between said circuit control module and any of said plurality of device types;
    wherein said computer system comprises a point-to-multipoint communication system;
    wherein said communications system operates in the millimeter wave frequency spectrum;
    wherein said communications system is a time division multiple access system;
    wherein said communications system is an adaptive time division duplex system; and,
    wherein the forward/reverse ratio is dynamically configurable.

15. The computer system of claim 1, wherein said data is transferred to a persistent storage.

16. The computer system of claim 15, wherein the persistent storage is a flash file system.

17. The computer system of claim 1, wherein circuit control module is a software object.

18. The computer system of claim 1, wherein said circuit control module is hardware device.

19. A computer system comprising:
    a plurality of processor nodes;
    a plurality of control agents operationally connected to each of said plurality of processor nodes;
    a generic device driver;
    a generic device agent; and
    at least one device type among a plurality of different device types, wherein the generic device driver and the generic device agent are configured such that if data is avaliable then data is exchanged between said control agent and any one of said plurality of device types;
    wherein said computer system comprises a point-to-multipoint communication system;
    wherein said communications system operates in the millimeter wave frequency spectrum;
    wherein said communications system is a time division multiple access system; and,
    wherein the data density within each frame is dynamically variable.

20. A computer system comprising:
    a plurality of processor nodes;

a plurality of control agents operationally connected to each of said plurality of processor nodes;

a generic device driver;

a generic device agent; and at least one device type among a plurality of different device types, wherein the generic device driver and the generic device agent are configured such that if data is available then data is exchanged between said control agent and any one of said plurality of device types;

wherein said computer system comprises a point-to-multipoint communication system;

wherein said communications system operates in the millimeter wave frequency spectrum;

wherein said communications system is a time division multiple access system;

wherein said communications system is an adaptive time division duplex system; and, wherein the forward/reverse ratio is dynamically configurable.

21. A computer system comprising:

a plurality of processor nodes;

a plurality of control agents operationally connected to each of said plurality of processor nodes;

a generic device driver;

a generic device agent; and at least one device type among a plurality of different device types, wherein the generic device driver and the generic device agent are configured such that if data is available then data is exchanged between said control agent and any one of said plurality of device types; wherein said generic device agent is operationally connected to a shared relational database.

22. The computer system of claim 21, wherein said computer system is a communications system.

23. The computer system of claim 21, wherein said circuit control module is a circuit state machine.

24. The computer system of claim 21, wherein said control agent and said device agent are common agents.

25. The computer system of claim 21, wherein said plurality of device types comprises SONET, T1, E1, ATM, modem.

26. The computer system of claim 21, wherein said data comprises one or more of performance monitoring data, initialization data, fault detection data, and operational reporting data.

27. The computer system of claim 21, comprising plural generic device agents; wherein ones of said generic device agents are operationally connected to one of a plurality of relational databases.

28. The computer system of claim 21, wherein said generic device agent is configured such that if data is available the data is exchanged between said control agent and any one of said plurality of device types.

29. The computer system of claim 22, wherein said communications system is a point-to-multipoint communication system.

30. The computer system of claim 29, wherein said communications system operates in the millimeter wave frequency spectrum.

31. The computer system of claim 30, wherein said communications system is a time division multiple access system.

32. The computer system of claim 31, wherein said communications system is a time division duplex system.

33. The computer system of claim 32, wherein said communications system is an adaptive time division duplex system.

34. The computer system of claim 21, wherein said data is transferred to a persistent storage.

35. The computer system of claim 34, wherein the persistent storage is a flash file system.

* * * * *